Sept. 4, 1934. H. MOURADIAN Re. 19,305

NEGATIVE IMPEDANCE REPEATER

Original Filed July 17, 1929 2 Sheets-Sheet 1

Hughes Mouradian

INVENTOR.

Sept. 4, 1934. H. MOURADIAN Re. 19,305

NEGATIVE IMPEDANCE REPEATER

Original Filed July 17, 1929 2 Sheets-Sheet 2

WITNESS:

INVENTOR

H. Mouradian

Reissued Sept. 4, 1934

Re. 19,305

UNITED STATES PATENT OFFICE 19,305

NEGATIVE IMPEDANCE REPEATER

Hughes Mouradian, Philadelphia, Pa.

Original No. 1,955,681, dated April 17, 1934, Serial No. 379,017, July 17, 1929. Application for reissue June 22, 1934, Serial No. 731,889

11 Claims. (Cl. 178—44)

This invention relates to repeater systems and, particularly, to the use of negative impedances as the amplifying and distortion correcting elements of such systems.

This application is a continuation in part of my earlier application, S. N. 188,497, filed May 3, 1927, on Transmission systems.

Where, as in the case of the circuits used in the present art, the total attenuation of a section of transmission line is substantially constant for a band of frequencies, then a "gain" which is nearly constant for said band of frequencies may be introduced at proper intervals through the use of vacuum tube amplifiers arranged in a two-way repeater system. This arrangement is the one now used in the art. It suffers under the handicap that even with comparatively light loading of the telephone conductors—.044 henry loading coils spaced 1.2 miles apart, the attenuation constant of the section of transmission line between telephone repeater stations rapidly builds up for frequencies near the so-called cutoff point of the line. I have discovered a new method for introducing a "gain" in a telephone transmission line which may be automatically varied with frequency. In addition to introducing a gain, said gain may also be varied to avoid distortion effects which are cumulative in effect and hence most severe on the longer lines.

In accordance with my invention, I obtain a result which is substantially equivalent to that obtained by means of a repeater of the 22-type, which is well known in the art. By making use of negative impedances as the amplifying elements, I am able to utilize devices for this purpose which, from their fundamental nature, possess the negative impedance property, such as the dynatron, which is described in an article entitled "The dynatron", by Dr. Alb. W. Hull, which was published in the Proceedings of the Institute of Radio Engineers, February 1918. Other forms of negative impedances which may be used in conjunction with the present invention are those disclosed in the following U. S. A. Patents: 1,606,350, Negative resistance, M. M. Dolmage; 1,779,126, Negative resistance circuits, F. H. Graham; 1,779,380, Negative impedance circuits, H. W. Dudley; 1,779,382, Negative impedence circuits, R. C. Mathes.

Figure 3:
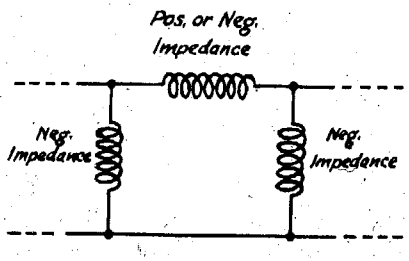

All of the above negative impedance devices are of the "constant" impedance type. These devices develop constant negative impedance characteristics provided, of course, the batteries associated with them are maintained substantially constant. In the case of the dynatron, the negative resistance characteristic, as fully described by the inventor in the Proceedings of the I. R. E., as already cited, obtains, within a certain voltage range as shown in Figure 3 (page 10) of said proceedings, viz., between 50 and 150 volts, and is also constant.

Figure 1:
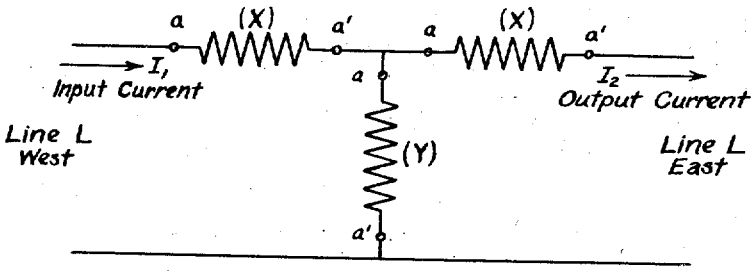
Figure 2:
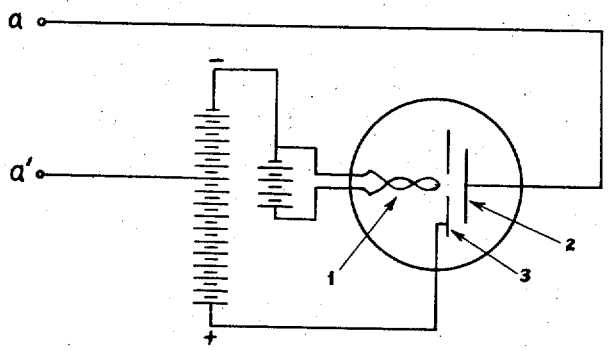
Figure 5:
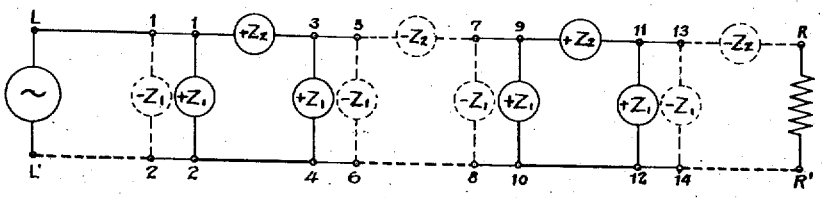
Figure 4:
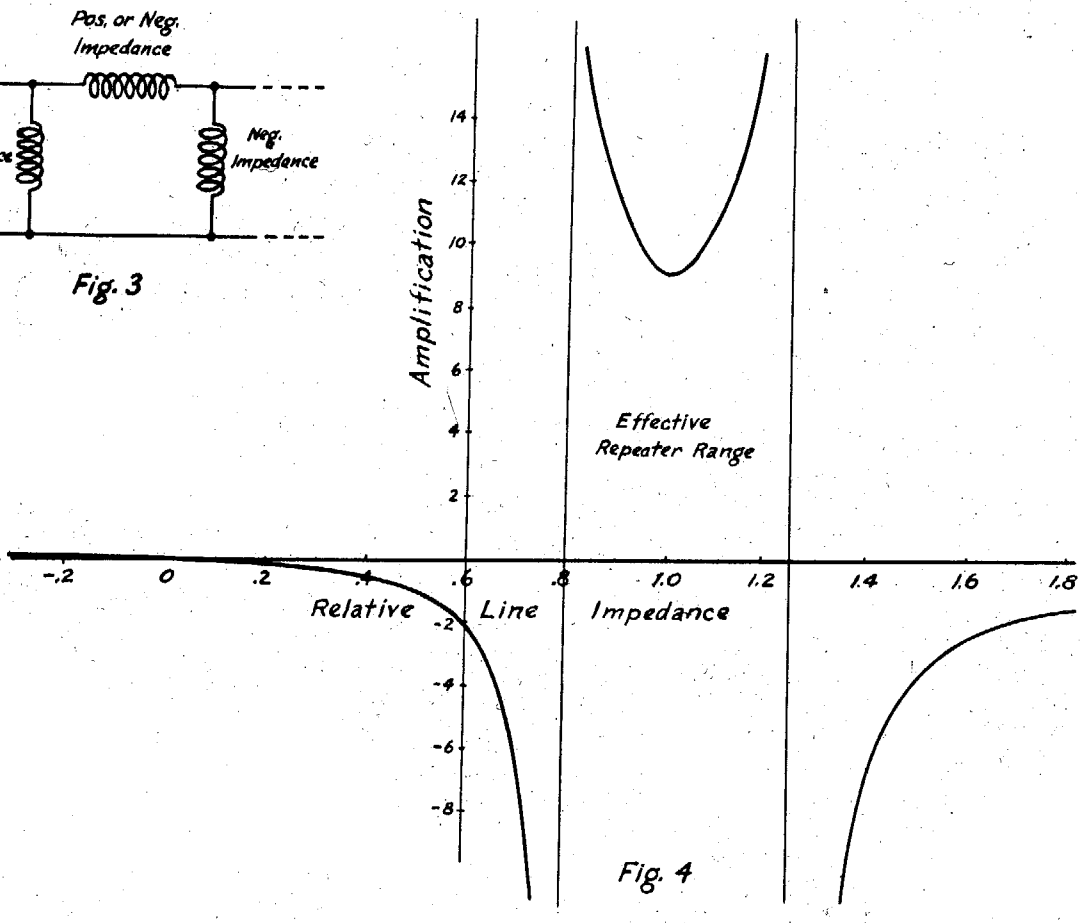

This invention will be clearly understood from the following description, when read in connection with the attached drawings, of which Figure 1 shows a T impedance network illustrating the principle underlying the invention, Figure 2 shows a form of negative impedance device that may be substituted for the impedance shown symbolically in Figure 1. An equivalent impedance network to that shown on Fig. 1 is shown on Fig. 3. In this case the impedance elements are connected in a $\pi$ formation. Fig. 4 shows the variation of the amplification obtained when use is made of the arrangements of either Fig. 1 or Fig. 3 when the line impedance differs from its average value. Figure 5 shows the broad conception of the use of neutralizing networks at recurrent intervals, each neutralizing network representing a negative impedance amplifier.

Figure 1 shows a network consisting of two equal impedances X and a third impedance Y connected between two lines, each having a characteristic impedance $Z_0$. Each of these impedances comprises a device possessing only two external terminals. If such an impedance has a positive resistance component, it absorbs energy; if it has a negative resistance component, it gives out energy.

Assuming that a wave is passing through this network from left to right, let $I_1$ and $I_2$ represent the currents flowing at the left and at the right-hand terminals, respectively, of the network. If we assume values for (X) and (Y) so that—

$$Z_0 = X + \frac{Y(Z_0+X)}{X+Y+Z_0} \qquad (1)$$

then, the impedance looking into the left-hand terminals of the network is equal to the impedance of the line. The same relation exists also between the impedance looking into the right-hand terminals of the network and the line impedance. From the diagram of this network it is seen that the ratio of the current $I_2$ to $I_1$ is given by the following relation:

$$n = \frac{I_2}{I_1} = \frac{Y}{X+Y+Z_0} \qquad (2)$$

Solving Equations (1) and (2) for X and Y, we obtain—

$$X = \frac{1-n}{1+n} Z_0 \qquad (3)$$

and—

$$Y = \frac{2n}{1-n^2} Z_0 \qquad (4)$$

If the network is proportioned in accordance with these equations, it is evident that there will be no reflection of the wave at the terminals of the network since the impedance looking into the network in each direction equals that of the line to which it is connected, while the transmission loss corresponds to current ratio $(n)$. This transmission loss can be expressed in transmission units in accordance with the following formula:

$$L=20\log_{10}\left(\frac{1}{n}\right) \qquad (5)$$

in which L is the transmission loss in *db*.

In the above formula $(n)$ may be real or imaginary. If imaginary, only the modulus of said imaginary should be used in Formula (5). It may be clearly seen that where $(n)$ is imaginary it simply means that the current, in addition to being amplified, has also been subjected to a phase shift.

In accordance with my invention I desire that the network shown in Figure 1 should possess the property of giving a transmission gain. In other words, the loss L must be negative. In order to make L negative, it is evidently necessary that $(n)$ be made greater than unity, although it makes no difference whether $(n)$ is positive or negative.

Now it will be seen by Equations (3) and (4) that if $n$ is made greater than 1 and positive, the impedance (X) and (Y) become negative; while if $(n)$ is made greater than 1 and negative, the impedance (X) becomes negative and (Y) becomes positive. Hence it is seen that by making some or all of the impedance devices which constitute the network shown in Figure 1 negative, the network is made to possess the property of giving a transmission gain. It is furthermore apparent that by choosing values of (X) and (Y) in accordance with Equations (3) and (4), the impedances looking into the network from either direction (as given by Equation (1)) will be positive and equal to the line impedance. From this it is evident that if the network of Figure 1 is thus properly proportioned, a wave reaching the network from either section of the line will be amplified and transmitted into the other line section, while no reflection will take place at either terminal of the network. Consequently there will be no echoes set up by the action of the network.

While the network shown above consists of three two-terminal impedance devices arranged in the form of a T, it is well known in the art that the behavior of any network of such two-terminal impedance devices can be completely matched by the behavior of a T-shaped network containing three properly chosen devices as shown in the figure. Consequently, in discussing the behavior of the T-shaped network, I have described the behavior of any possible combination of two-terminal impedance devices which can be assembled to produce the desired effect of amplifying the waves transmitted through the network without setting up echoes due to the action of the network.

In illustration of the point just made it may be shown that the network elements might be arranged in a $\pi$ instead of a T as hereinabove outlined in detail. The pillar elements, in such a case, would have to be negative impedance devices, while the architrave might be either a positive impedance or a negative impedance device. In the case of a network arranged on a $\pi$ basis, the values required are, using the same notation as hereinabove—

$$\text{Architrave element}=Z_0\frac{1-n^2}{2n} \qquad (6)$$

$$\text{Pillar element}=Z_0\frac{1+n}{1-n} \qquad (7)$$

In the foregoing description, I have shown how to determine the values of impedances which, when assembled into a T-shaped network, will give any desired amplification without the production of echoes in the transmission circuits. As has been shown, the obtaining of amplification requires that some or all of the impedances be negative.

The amplification of the network shown in Figure 1 of the drawings varies with the impedance of the line, being equal to $(n)$ when the line has its average impedance ($Z_0$). If the two lines connected together by means of the network have equal impedances, but different from their average value $Z_0$ which was used in deriving the constants of the network as given by Formulas (3) and (4), then there will be some "reflection" on electric waves reaching the network from either the left hand or the right hand side of the terminals of this network. The ratio of currents $$n=\frac{I_2}{I_1}$$

of Formula (2) does not represent the true or complete effect of the network. Obviously Formula (1) does not hold either, since only in the case where Z in that formula has its average value $Z_0$ will that formula hold. It is evident that the true amplification is given by the change in line current at the receiving end under the following two conditions.

(*a*) When the network is eliminated entirely and the two lines having equal impedances Z are connected together.

(*b*) When the network, designed on the basis of some average line impedance value $Z_0$, is interposed between the same two lines.

If the network is eliminated completely, assuming an electromotive force (E) impressed upon the left hand side of the circuit, the current I into the right hand side is given by $$I=\frac{E}{2Z} \qquad (8)$$

If, now, the network is interposed, the current into the line at the right hand side of the network is given by the relation $$I'=E\frac{Y}{(Z+X)(Z+X+2Y)} \qquad (9)$$

The change in current $$\frac{I'}{I}$$

is a complete expression of the effect of the network, when interposed between lines of equal impedance Z. If we designate by $(m)$ the numerical value of this change $$\frac{I'}{I},$$

it is equal to:

$$m=\frac{2Z(Y)}{(Z+X)(Z+X+2Y)} \qquad (10)$$

It must, of course, be assumed throughout that the values of the impedance branches (X) and (Y) have been designed in accordance with (3) and (4).

It may now be shown that, if in Formula (10) we replace X and Y respectively by their numerical values given by Formulas (3) and (4), we obtain for the amplification ($m$) a value which varies naturally with the value of the variable line impedance, as follows:

$$m=\frac{4nZ(Z_0)}{\{Z(1-n)+Z_0(1+n)\}\{Z(1+n)+Z_0(1-n)\}} \quad (11)$$

When Z is given its average value $Z_0$, the variable amplification coefficient ($m$) becomes equal to normal design value ($n$), as shown below:

$$m=\frac{4nZ_0^2}{(2Z_0)(2Z_0)}=n$$

It will be seen immediately that the variable amplification ($m$) becomes infinitive for two different limiting values of line impedance $Z_1$ and $Z_2$, as follows:

$$Z_1=-Z_0\frac{1+n}{1-n}$$

$$Z_2=-Z_0\frac{1-n}{1+n}$$

The product of the two values of line impedance, each of which results in infinity amplification is equal to:

$$Z_1Z_2=Z_0^2 \quad (12)$$

It follows, therefore, that a predetermined value ($n$) for the amplification is obtained, provided the line impedance does not depart appreciably from its average value $Z_0$. If the two lines vary in impedance—still staying equal to each other—then the amplification gradually increases until it reaches infinity for two values of line impedance, one greater than $Z_0$ and one smaller than $Z_0$, their product being equal to $Z_0^2$ as given by Formula (12).

Figure 4 of the drawings shows in graphical form the value of ($m$) as obtained from Formula (11). In this figure the value of the line impedance Z is shown in abscissæ and ($m$) in ordinates. The curve as shown, has a minimum corresponding to real amplification and a maximum which does not represent any amplification. The maximum corresponds to the case where the impedance of the line has changed sign and has now the same sign as the negative impedance elements of the impedance network of Figure 1 of the drawings. The numerical values of Z which result in a maximum or minimum for ($m$) are obtained by differentiation of ($m$) with reference to Z, which gives, after some simplification;

$$Z=\pm Z_0$$

If we designate the ratio of $$\frac{Z_1-Z_0}{Z_0}$$

by ($r$) then $$r=\frac{Z_1}{Z_0}-1=\frac{-2}{1-n} \quad (13)$$

In Formula (13) the ratio ($r$) is given as a function of ($n$). In practice, the opposite situation arises. It is usually desired to find out what the amplification ($n$) for "normal" or "average" line impedance would be, if we know beforehand the maximum variation ($r$) in line impedance that is likely to be encountered. Solving Equation (13) for ($n$) we get:

$$n=\frac{2+r}{r} \quad (14)$$

This is exactly the amplification that is now possible to obtain in the art through the use of the well known "22" type telephone repeater circuit. It is therefore clear that the arrangement shown on Figure 1 of the drawings is an exact equivalent of the arrangement now used in the telephone art in conjunction with two-wire circuits. It is limited as to its range of use within exactly the same line impedance variations as its present equivalent in the art. It will give a constant gain as measured by Formula (5) for that band of frequencies for which the average line impedance $Z_0$ is substantially the same. It will "sing" and cease to be a repeater when the line impedance variation ($r$), for some one frequency, exceeds the limits given by Equation (13). That particular frequency will limit the band of frequencies for which the repeater is an effective instrument of amplification. It will also be noted that the arrangement first described in these specifications, is the first known to the art using constant negative impedances in network arrangement. Other arrangements have been described by earlier inventors which depend upon the variations of the negative impedances, or of the positive impedances (in the form of ionized gas resistances) or of both types of impedances to secure amplification. When use is made of the arrangement, as first disclosed in these specifications, only constant impedances are required. It is also the first truly amplifying arrangement known to the art which makes use of just three (3) impedances arranged in either T or "$\pi$" network, substantially as hereinabove described.

It has been pointed out hereinabove that, though the network herein described may be composed entirely of negative impedances, its characteristic impedance nevertheless is positive and can be made equal to that of the positive characteristic impedance of the signaling system with which it is associated. That requirement is expressed analytically by Equation (1). If that equation is solved for ($Z_0$), in function of the network impedance values (X) and (Y), we find—

$$Z_0^2=X^2+2XY \quad (15)$$

If in the above the values of X and Y, as obtained from Equations (3) and (4) are substituted, an identity is obtained. Now, though (X) and (Y) may both be negative, it is readily seen that the numerical value of the terms ($X^2+2XY$) will be positive. It is important to note further that, if the two architrave impedances (X) are negative, (Y) may be positive, as already indicated in the discussion following Equation (5), and the T network will still operate as an amplifying system. This fact, the development of a positive characteristic impedance in a network of three impedances, some or all of which are negative, is the key to the possibility of using negative impedances as an amplifying system. It may also be pointed out here that any two-way amplifying system whatsoever using negative impedances can be reduced to the two fundamental prototypes—the T and $\pi$ networks as herein disclosed.

There are a great many ways which are well known in the art whereby a two-terminal device which will have the desired negative impedance property may be obtained. One of these is illustrated in Figure 2, hich shows the circuit of the dynatron, previously mentioned, when used as a negative impedance. The dynatron (Proceedings of the Institute of Radio Engineers) comprises a filament (1), a plate (2), and an anode (3), having an opening therein through which electrons pass from the filament to the plate. The theory underlying the operation of such devices is fully disclosed in said proceedings and, for simplicity, will be omitted from this specification. The terminals *a—a'* should be connected with the line L at the correspondingly designated terminals shown in Figure 1.

Certain outstanding advantages of the amplifying system using negative impedances as herein disclosed will be apparent to those who have a knowledge of the practices in the art. As compared, for instance, with the two-way 22-type repeater system now so universally in use, the system first disclosed herein does not interrupt the continuity of the circuit. It is thus possible to transmit battery signals or dialing impulses through the amplifying system. This is not now possible with the 22-type standard repeater system. Similar advantages hold as regards the transmission of telegraph signals through the repeaters. Where it is necessary to provide any of the features just mentioned, it is now necessary to provide complicated and expensive equipment bridged around the telephone repeaters of the 22-type. In addition, the overall power efficiency of the system as herein first described is twice as good as the overall power efficiency of the 22-type system on account of the losses encountered with the latter in the "balancing networks".

While the invention has been disclosed as embodied in a particular form, it is capable of embodiment in other and different forms within the spirit and scope of the appended claims. For instance, a negative impedance using ordinary vacuum tube amplifiers and ordinary wiring and battery supply arrangements may also be obtained through the application of the arrangement disclosed by Latour in U. S. A. Patent 1,687,253. This arrangement describes a two-terminal network which develops a constant negative impedance and is suitable for use with the invention first described hereinabove.

The specifications as hereinabove outlined fully describe the operating characteristics of a two-way telephone amplifier using "negative" impedances as the constituent parts of such an amplifier. It has been shown (see Formula 14) that the amplification obtainable by the arrangement first disclosed in these specifications is exactly the same as that now obtained by the use of two-way telephone repeaters known as the "22" type. The negative impedance repeater as herein disclosed may therefore be substituted for a "22" type repeater of the present art in any transmission circuit. As well known, such repeaters may be used in tandem arrangement in any number without mutual interference. Consequently, the negative impedance repeater described hereinabove can also be so used at recurrent intervals. It is customary at present to space telephone repeaters at 50-mile intervals in voice frequency cable circuits, and such spacing will prove equally economical with the type of repeater first outlined hereinabove. It is expected further that the use of the repeaters of the new type will prove less susceptible to "singing" in view of the absence of local circuits similar to those typical of the "22" type circuit, wherein the outgoing circuit east of the repeater sends through an unbalance current to the incoming circuit of the "west" repeater.

In Figure 5 of the drawings is shown an arrangement originally filed on May 3, 1927 as Figure 4 of the drawings of S. N. 188,497, now abandoned. The present application is a continuation in part of the above prior application. This figure shows the broad conception underlying the present invention, i. e., the use of "negative" impedances forming an artificial network representing the exact negative of the equivalent network of a section of natural transmission line. When such "neutralizing" networks are interposed in a transmission line and the constituent parts thereof are duly proportioned with respect to the constants of said transmission line, it is possible to completely "neutralize" or eliminate the effect of the presence of a transmission line between any two distant points. The effect of such an arrangement therefore is the realization of an ideal, that of a so-called zero-loss line. When the conception underlying Figure 5 of the drawings is carried through to its theoretical limits, not only is it possible to obtain "amplification", a desirable objective by itself (but it is also possible to obtain "distortionless" transmission, in that both attenuation and phase change will evidently be the same for all frequencies. This is clearly shown by the arrangement of Figure 5 of the drawings, wherein the equivalent "$\pi$" network of a natural transmission line is illustrated as connected to terminals 1, 2, 3 and 4, while the corresponding "neutralizing" type network is connected to terminals 5, 6, 7 and 8. The two shunt impedances ($+Z_1$) of the equivalent network of the line are "neutralized" by the corresponding two negative shunt impedances ($-Z_1$) of the artificial network. The series architrave impedance ($+Z_2$) is also neutralized by the corresponding series negative impedance ($-Z_2$) of the artificial network, as shown. The result, so far as transmission is concerned, is simply that the natural line, for all practical purposes, has been removed from the transmission path. Everything happens as if the generator at the originating end and the receiving equipment at the distant end were connected by a line of zero length. Such a line, naturally, offers neither attenuation nor phase change effects. We have thus removed or eliminated "distortion" as well as attenuation.

It is clearly necessary, in order to carry into practice the conception underlying Figure 5 of the drawings, to have available negative impedances, marked on said figure as ($-Z_1$), ($-Z_2$), etc. In U. S. A. Patent 1,687,253, granted to Latour, is shown a general method for obtaining negative impedances of any type. Other inventors, as previously mentioned in these specifications, have also shown similar methods for obtaining negative impedances.

Since the equivalent network of a section of transmission line, such as shown connected to terminals 1, 2, 3 and 4 of Figure 5 of the drawings, represents a so-called transmission loss between terminals 1, 2 and terminals 3, 4, it follows that the artificial neutralizing network connected to terminals 5, 6, 7 and 8 represents a so-called transmission gain. Any device in the art which introduces or is responsible for a gain is also designated as a repeater or amplifier. The artificial network connected to terminals 5, 6, 7 and 8 is in effect a "negative impedance repeater". It is more complicated in type than the usual type repeater, since to realize it in practice it is necessary to obtain the "negatives" of impedances of general type, instead of providing only a negative resistance. To make this point absolutely clear, Figure 19 was provided in my prior application, S. N. 188,497, showing what might be, for a given case, the constituent parts of impedances ($+Z_1$) and ($+Z_2$), whose "negatives" it is necessary to supply for the purposes indicated above.

In the present specifications, the simple case of an amplifier inserted in a loaded cable circuit was outlined in detail. Such loaded cable circuits, as well known, have a negligible reactance component, when properly terminated, and an amplifying system built on the basis of negative resistances only is satisfactory in such a case. The application of the broad underlying principle of the present invention is not, however, restricted to communication circuits which have characteristic impedances with zero or negligibly small reactance component, as fully explained hereinabove. The general design features, as fully outlined in the present specifications, apply with equal force to the general case where the constituent parts of the "$\pi$" structure representative of a section of transmission line are impedances of general type. For instance, Formulas (6) and (7) of the present specifications apply to the general case represented on Figure 5 of the drawings. It has been shown hereinabove that the characteristic impedance of the artificial network can be made equal to that of the natural line, even though the artificial network has only negative impedances as constituent parts. It may be further stated that, of necessity, the propagation constant of the same artificial network, when designed as shown on Figure 5 of the drawings, is equal in absolute value but exactly opposite in sign to that of the corresponding section of the transmission line, since with full neutralization the current at the beginning and that at the end of the composite transmission system illustrated on Figure 5 must be equal both in amplitude and in phase.

Reference may be made, for a more detailed exposition of the underlying principles involved in the present invention, to a paper presented by me in April 1928 before the Franklin Institute of Pennsylvania (published in the journal of the same institute in February 1929).

I claim:

1. A system of electrical wave transmission interposed between two telephone offices, consisting of a telephone line cut into sections at recurrent points by a system of series and shunt impedances, said impedances in combination representing at each cut a section of artificial telephone line of opposite series and shunt characteristics to those of the actual line.

2. A repeating amplifier comprising a plurality of constant impedance devices, two of which are negative, forming a T network.

3 A repeating amplifier comprising a plurality of constant impedance devices, all of which are negative, forming a T network.

4. A T network of impedance devices for connection to a signaling line of average impedance $Z_0$, having its series elements designed in accordance with formula $$X=\frac{1-n}{1+n}Z_0$$

and its shunt elements in accordance with formula $$Y=\frac{+2n}{1-n^2}Z_0,$$

wherein $n$=a numeric greater than unity.

5. A "$\pi$" network of impedance devices for connection to a signaling line of average impedance $Z_0$, having its pillar elements equal to $$Z_0\frac{1+n}{1-n}$$

and its architrave element equal to $$Z_0\frac{1-n^2}{2n}$$

wherein ($n$) is a numeric greater than unity.

6. A T network of constant impedance devices, some or all of which are negative, for connection to a signalling line, having a characteristic impedance equal to the characteristic impedance of the signalling line.

7. A "$\pi$" network of impedance devices, some or all of which are negative, for use in combination with a signaling line, said network having a characteristic impedance equal to the characteristic impedance of the signaling line.

8. In a signaling system, the combination with a line of a repeating amplifier interposed between sections thereof, said amplifier comprising a constant negative impedance device in series with each section of said line section and a constant positive impedance in shunt with said line.

9. In a signaling system, the combination with a line of a repeating amplifier interposed between sections thereof, said amplifier comprising a constant negative impedance device in series with each section of said line and a constant negative impedance in shunt with said line.

10. In a signaling system, the combination with a line of a repeating amplifier interposed between sections thereof the said amplifier consisting of a combination of series and shunt negative impedances.

11. In a signaling system, the combination with a line of a repeating amplifier interposed between sections thereof, the said amplifier consisting of an electrical "network" having a characteristic impedance equal to the characteristic impedance of the line, said "network" consisting of a combination of series and shunt negative impedances.

HUGHES MOURADIAN.